US011350017B1

(12) United States Patent
Doria

(10) Patent No.: US 11,350,017 B1
(45) Date of Patent: May 31, 2022

(54) PRINTING DEVICE CALIBRATION SYSTEM AND METHODS

(71) Applicant: Kyocera Document Solutions Inc., Osaka (JP)

(72) Inventor: Steve A. Doria, Los Angeles, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/149,057

(22) Filed: Jan. 14, 2021

(51) Int. Cl.
*H04N 1/60* (2006.01)
*H04L 9/30* (2006.01)
*G06F 3/12* (2006.01)
*G01N 21/31* (2006.01)

(52) U.S. Cl.
CPC ......... *H04N 1/6044* (2013.01); *G06F 3/1211* (2013.01); *G06F 3/1256* (2013.01); *G06F 3/1287* (2013.01); *H04L 9/30* (2013.01); *G01N 21/31* (2013.01)

(58) Field of Classification Search
CPC ... H04N 1/6044; G06F 3/1211; G06F 3/1256; G06F 3/1287; H04L 9/30; H04L 63/126; G01N 21/31; G01N 1/4055; G01N 2021/5942

USPC .......................................... 358/1.9
See application file for complete search history.

(56) References Cited

U.S. PATENT DOCUMENTS 9,779,339 B2  10/2017  Tsuruyama
2007/0161115 A1*  7/2007  Schwartz ............... G01N 21/31
436/164

* cited by examiner

*Primary Examiner* — Darryl V Dottin
(74) *Attorney, Agent, or Firm* — Millen, White, Zelano & Branigan, P.C.; William Nixon

(57) ABSTRACT

Calibration requests are received at a network service. The network service assigns a request identifier for the data of a request. The request identifier is encoded into a control strip on a test color sheet using color patches. A color encoding key encodes the request identifier using the color patches. After the test color sheet is printed, a color measurement tool is used to decode the information from the control strip, including the request identifier. The color measurement tool measures the test color strips on test color sheet. The request identifier corresponds to the measurement data. The measurement data along with the request identifier is sent to the network service. The measurement data is processed to generate calibration data, which is used to update the printing device.

20 Claims, 10 Drawing Sheets

PRINTING DEVICE CALIBRATION SYSTEM AND METHODS

FIELD OF THE INVENTION

The present invention relates to a printing device calibration system and associated methods to encode request information within the printing device calibration test color sheet.

DESCRIPTION OF THE RELATED ART

Printing devices, especially production printing devices, require color calibration to confirm operating conditions. Variance in color capabilities may cause problems during large scale production print jobs. When a calibration request is received, an operator may have to manually enter information about the calibration request into an application. For example, the operator may have to scan a barcode using a tool or component separate from the printing device.

SUMMARY OF THE INVENTION

A method for processing data to calibrate a printing device is disclosed. The method includes generating a request identifier associated with the printing device and a paper type of a plurality of paper types. The method also includes encoding the request identifier into a control strip for a test color sheet using a color encoding key. The encoded request identifier comprises a plurality of color patches. The method also includes sending a print job to the printing device for the control strip and the test color sheet having a plurality of test color strips. The method also includes printing the test color sheet at the printing device. The method also includes decoding the request identifier from the control strip using a color measurement tool. The method also includes measuring the plurality of test color strips on the test color sheet with the color measurement tool to generate measurement data. The method also includes generating a cryptographic signature of the measurement data and the request identifier. The method also includes uploading the cryptographic signature, the measurement data, and the request identifier to a cloud-based network service. The method also includes processing the measurement data to generate calibration data. The method also includes updating the printing device according to the calibration data.

A method for capturing measurement data for a plurality of test color sheets corresponding to calibration requests is disclosed. The method includes encoding a first request identifier and a first request type into a first control strip of color patches in a first test color sheet according to a color encoding key. The first control strip includes the color encoding key. The method also includes encoding a second request identifier and a second request type into a second control strip of color patches in a second test color sheet according to the color encoding key. The second control strip includes the color encoding key. The method also includes queuing the first test color sheet and the second color sheet to print at a printing device. The method also includes printing the first test color sheet and the second test color sheet at the printing device. The method also includes decoding the first request identifier and the first request type from the first control strip for the first test color sheet using a color measurement tool. The method also includes measuring at least one first test color strip printed on the first test color sheet using the color measurement tool to generate a first set of measurement data. A number of the at least one first test color strip relates to the first request type. The method also includes decoding the second request identifier and the second request type from the second control strip for the second test color sheet using the color measurement tool. The method also includes measuring at least one second test color strip printed on the second test color sheet using the color measurement tool to generate a second set of measurement data. A number of the at least one second test color strip relates to the second request type. The method also includes uploading the first set of measurement data and the second set of measurement data to a cloud-based network service. The method also includes storing the first set of measurement data according to the first request identifier and the second set of measurement data according to the second request identifier within the network service.

A printing system is disclosed. The printing system includes a cloud-based network service. The printing system also includes a printing device connected to the cloud-based network service. The printing system, using the cloud-based network service and the printing device, is configured to generate a request identifier associated with the printing device and a paper type of a plurality of paper types. The printing system also is configured to encode the request identifier into a control strip on a test color sheet. The encoded request identifier comprises a plurality of color patches. The printing system also is configured to send a print job to the printing device for the test color sheet having the control strip. The printing system also is configured to print the test color sheet at the printing device. The printing system also is configured to decode the request identifier from the control strip of color patches printed on the test color sheet using a color measurement tool. The printing system also is configured to measure a plurality test color strips on the test color sheet with the color measurement tool to generate measurement data. The printing system also is configured to generate a cryptographic signature for the measurement data and the request identifier. The printing system also is configured to upload the cryptographic signature, the measurement data, and the request identifier to the cloud-based network service. The printing system also is configured to process the measurement data to generate calibration data. The printing system also is configured to update a configuration of the printing device with the calibration data.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
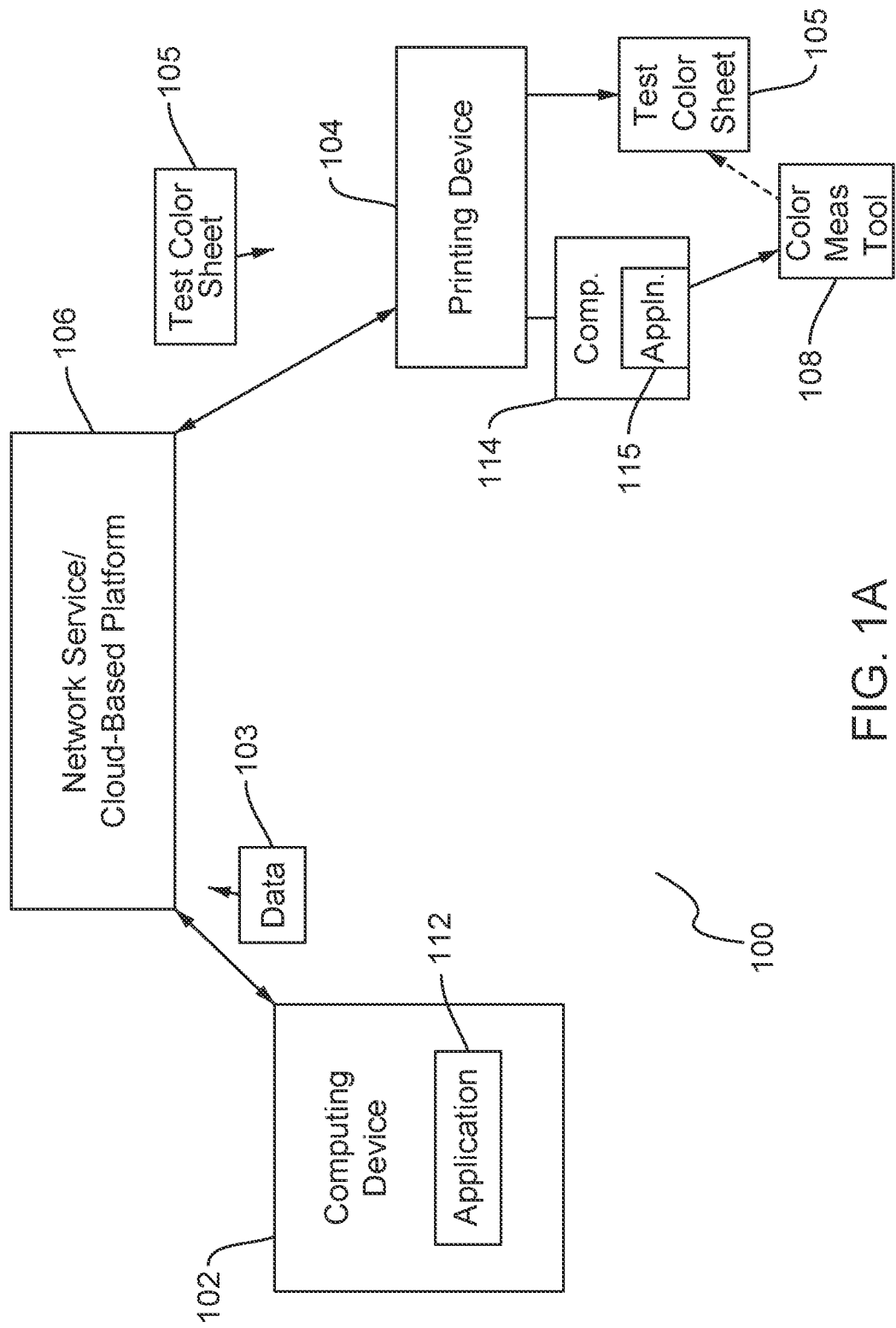
FIG. 1A illustrates a block diagram of a printing device calibration system for a printing device according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet.

Control strip—a test color strip that also contains encoded information.

Test color sheet—a printed page or to-be-printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

According to some embodiments, a user may request printing device calibration for a particular printing device and paper through an internet web site, computer-implemented application, or network service. A request identifier is associated with other information such as the printing device and paper under calibration. The request identifier and associated information may be stored on a network service database. The network service generates a print job and sends it to the target printing device. The generated print job includes a calibration test sheet with the request identifier encoded as a series of color patches. The print job causes the printing device to output the calibration test sheet.

An operator retrieves the calibration test sheet from the printing device. The operator then may use a computer software application and a color measurement tool to "measure the control strip," which includes the encoded request identifier and a request type of the calibration test sheet. The operator measures the control strip by moving the color measurement tool over the test color sheet. In some embodiments, the color measurement tool is moved by hand.

The computer software application decodes the request identifier and the request type from the data provided by the control strip. The computer software application displays the appropriate screens to enable calibration processing based on the request type. The operator uses the color measurement tool to measure the remaining test color strips. The number of color strips vary between different request types. When all the test color strips are measured, the computer software application generates a cryptographic signature over data that it uploads to the network service.

The request identifier, color measurements, a user identifier, and the cryptographic signature of the prior three data items are uploaded by the computer software application to the internet web site. The user identifier may identify a user or group of users. The user identifier, and public and private keys associated with the cryptographic signature, may be kept in a configuration file with the computer software application. The internet web site stores the user identifier and public key of the asymmetric cryptographic signature algorithm. The internet web site uses the uploaded user identifier to retrieve the associated public key from its database. The signature of the uploaded data is verified using the public key before the uploaded data is further processed.

The internet web site may reassemble the calibration request and associate the uploaded measurement data using the uploaded request identifier. The measurement data may be processed in different ways depending on the request type.

FIG. 1A depicts a printing device calibration system 100 for a printing device 104 according to the disclosed embodiments. FIGS. 1B, 1C, 1D, and 1E depict components within calibration system 100 in greater detail. Printing device 104 may receive print jobs from devices connected through system 100. For example, computing device 102 may send documents to print to printing device 104.

In some embodiments, computing device 102 may include an application 112 that generates data for printing that is sent to network service 106. Network service 106 also may exchange data with printing device 104 for performing calibration operations, specifically color calibration. In some embodiments, network service 106 is a server that manages print jobs and tasks between a plurality of printing devices. Network service 106 also provides calibration operations to the printing devices. A user may perform calibration tasks for the plurality of printing devices using network service 106 from computing device 102.

Preferably, network service 106 is a cloud-based service that allows for inspection, calibration, and profiling of color print jobs. Network service 106 may act as a software as a service (SaaS) solution that provides color management from a cloud-based platform. The service enables repeatable color reproduction at the printing devices. Network service 106 also may manage digital front ends (DFEs) from production printing which include paper catalogs. These paper catalogs may include paper measurements and paper color measurement profiles.

Figure 1B:
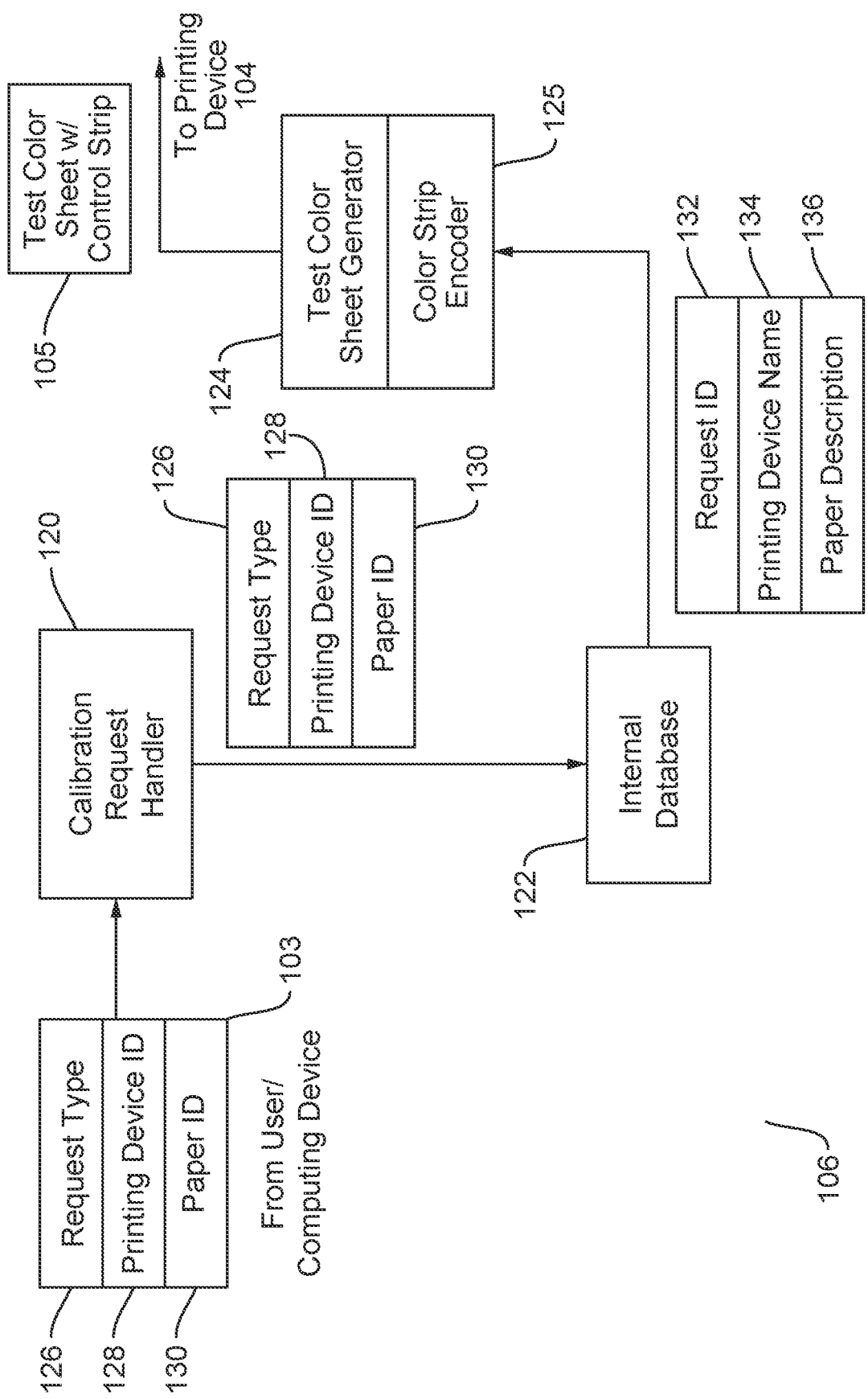
FIG. 1B illustrates a block diagram of a network service to generate a test color sheet according to the disclosed embodiments.

A user requests calibration for a particular printing device 104 within system 100. The user may utilize application 112 on computing device 102 to generate the order to generate calibration data for printing device 104. This order may be shown as data 103 in FIG. 1A. Referring to FIG. 1B, data 103 may include request type 126, printing device identification 128, and paper identification 130. In order to ensure the best possible color reproduction, production printing devices may associate color management profiles with specific paper media. Most printing devices may use hundreds of different paper types, with each paper resulting in printing and measuring color patches. Thus, the user may generate and send a large number of requests for calibrations of these different types of papers at once.

Network service 106 receives data 103 for calibration of printing device 104 based on printing device identification 128 according to request type 126 and paper identification 130. Network service 106 generates a print job for test color sheet 105 to obtain calibration data for the paper at printing device 104. Test color sheet 105 also may be referred to as a calibration test sheet. Test color sheet 105 is disclosed in greater detail by FIG. 1E. Printing device 104 prints test color sheet 105.

An operator takes test color sheet 105. The operator, which also may be the user disclosed above, uses color measurement tool 108 and software application 115 to measure the color patches on test color sheet 105 to obtain calibration data. Test color sheet 105 also includes a control strip having encoded information based on data 103 received at network service 106. Test color sheet 105 includes test color strips having test color patches to use in generating the calibration data. These features are disclosed in greater detail below. In some embodiments, the operator may measure the test color patches on test color sheet 105 by moving color measurement tool 108 over the appropriate parts of the sheet. The movement may be done by hand. In other embodiments, printing device 104 may perform these measurements using an inline measurement tool as opposed to a near-line measurement tool.

A computing device 114 may execute software application 115 that receives data from color measurement tool 108 and processes the data for use in calibrating printing device 104. Application 115 may interface with network service 106 to deliver the data thereto. In some embodiments, computing device 114 is part of printing device 104 such that application 115 executes on the printing device. The measurements may be performed by the printing device and sent to network service 106 without the need for an operator.

Application 115 decodes the data provided by the control strip on test color sheet 105 to identify it and the pertinent information to obtain the calibration data. These features are disclosed in greater detail below. The operator then uses color measurement tool 108 to measure the test color strips of test color patches on the sheet. The number of test color strips vary between different request types. When all test color strips are measured, application 115 generates a cryptographic signature over the data, which is uploaded to network service 106. Network service 106 stores the uploaded information from application 115 until it can be processed according the calibration request type.

FIGS. 1B, 1C, 1D, and 1E disclose the features of system 100 in greater detail. FIG. 1B depicts a block diagram of network service 106 to generate test color sheet 105 according to the disclosed embodiments. The user may use application 112 on computing device 102 to enter a request type, or type of process to obtain the calibration data, along with the targeted printing device and type of paper. As disclosed above, printing devices may use dozens or even hundreds of types of paper. A printing device should be able to reproduce the color on each type of sheet in a consistent manner. Application 112 may send this information as data 103 to network service 106.

FIG. 1B shows network service 106 along with some of its components. Network service 106 may include a calibration request handler 120 that receives data 103 having calibration request type 126, printing device identification 128 which uniquely identifies printing device 104 within system 100, and paper identification 130, which identifies the paper to be used as a test color sheet. The user may request printing device calibration through an internet web site that directs computing device 102 to network service 106. Calibration request handler 120 may send this information for the calibration request to internal database 122, where an entry is created along with the generation of request identifier 132. The request identifier may be generated by calibration request handler 120 or at internal database 122. Internal database 122 may assign the next available request identifier to the calibration request received at network service 106.

Internal database 122 forwards request identifier 132, printing device name 134, and paper description 136 to test color sheet generator 124 after this information is assigned to the request type, the printing device identification, and the paper identification received from calibration request handler 120. Printing device name 134 may correspond to printing device identification 128. Paper description 136 may correspond to paper identification 130. Internal database 122 stores the information for the printing device name and the paper description associated with the received identifications.

Along with the information related to the calibration request, request identifier 132 is added to the data. Request identifier 132 uniquely identifies the calibration request within system 100. Preferably, the request identifier is a number to track the request within system 100 and at printing device 104. Conventional printing systems would send this information to the operator, who then would need to input the number while measurements of the test color sheet are being taken. The disclosed embodiments avoid this by encoding request identifier 132 within test color sheet 105.

Test color sheet generator 124 takes the information from internal database 122, or, in some instances, from calibration request handler 120, to generate test color sheet 105. Test color sheet generator 124 includes control strip encoder 125. Test color sheet generator 124 creates the print job for test color sheet 105 based on request type 126 and paper identification 130. Control strip encoder 125 generates the control strip, disclosed in greater detail, for inclusion on test color sheet 105. The print job for test color sheet 105 is sent to printing device 104, as indicated by printing device identification 128.

Figure 1C:
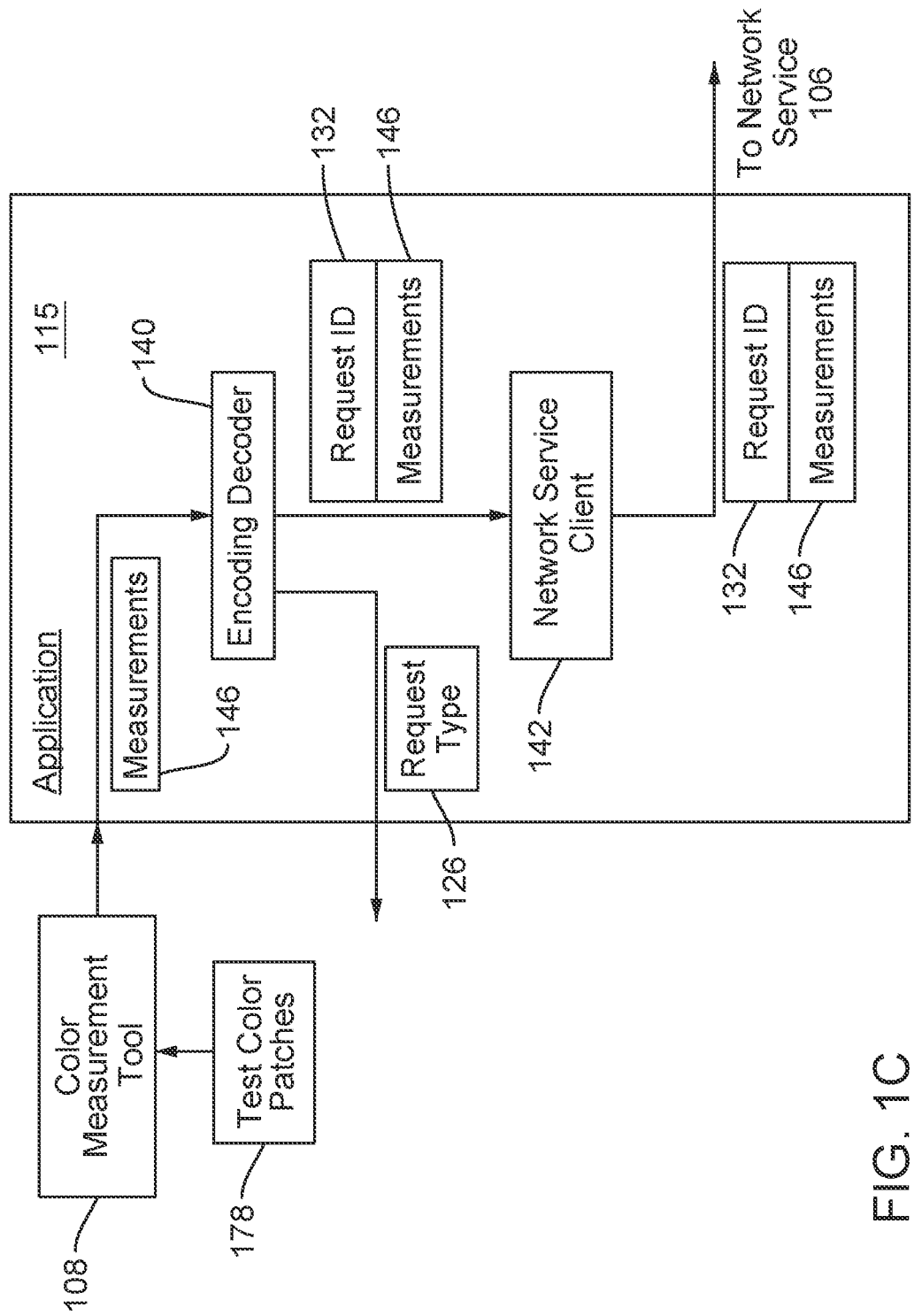
FIG. 1C illustrates a block diagram of a color measurement tool and an application according to the disclosed embodiments.
Figure 1D:
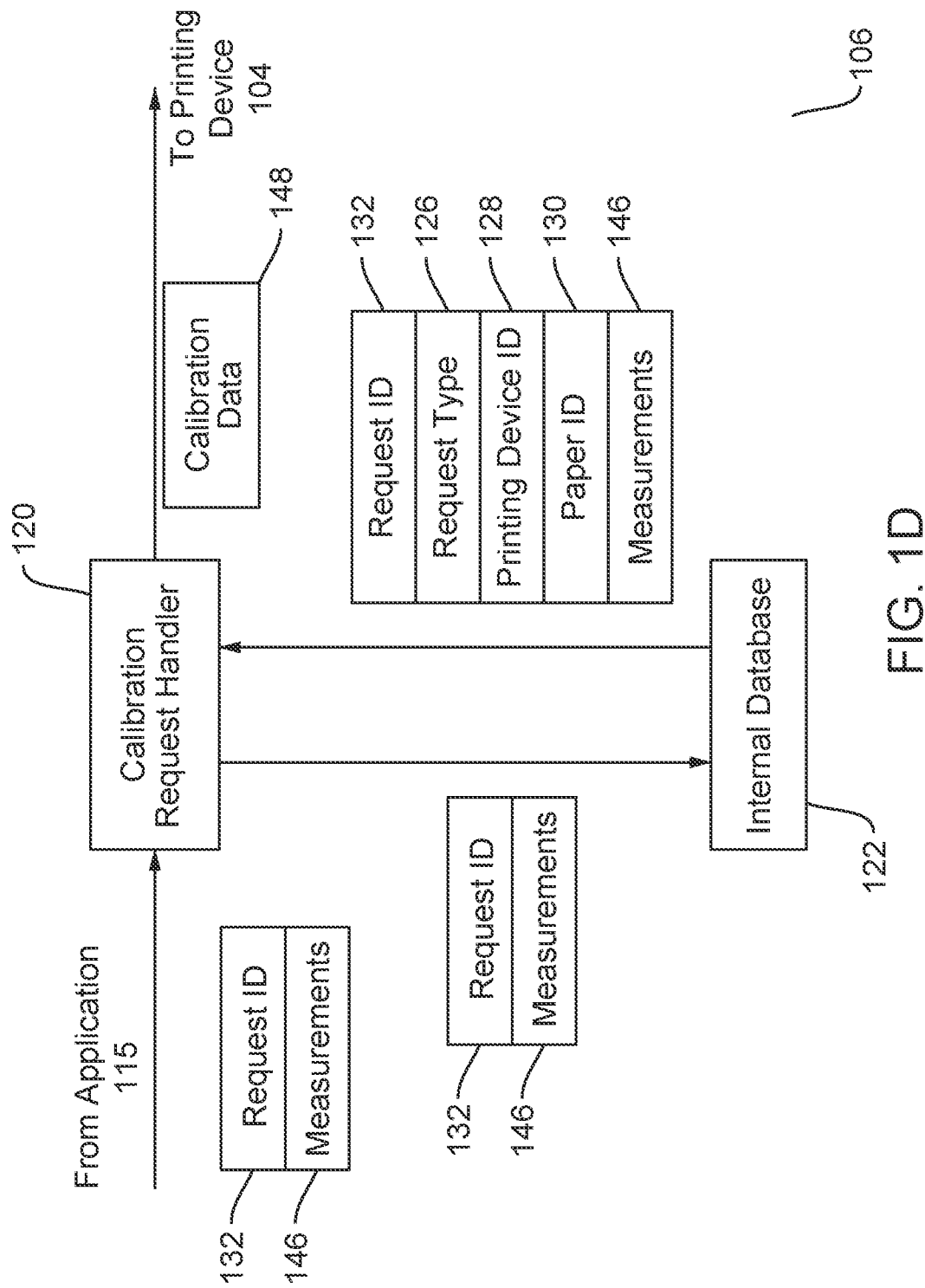
FIG. 1D illustrates a block diagram of the network service to generate calibration data according to the disclosed embodiments.
Figure 1E:
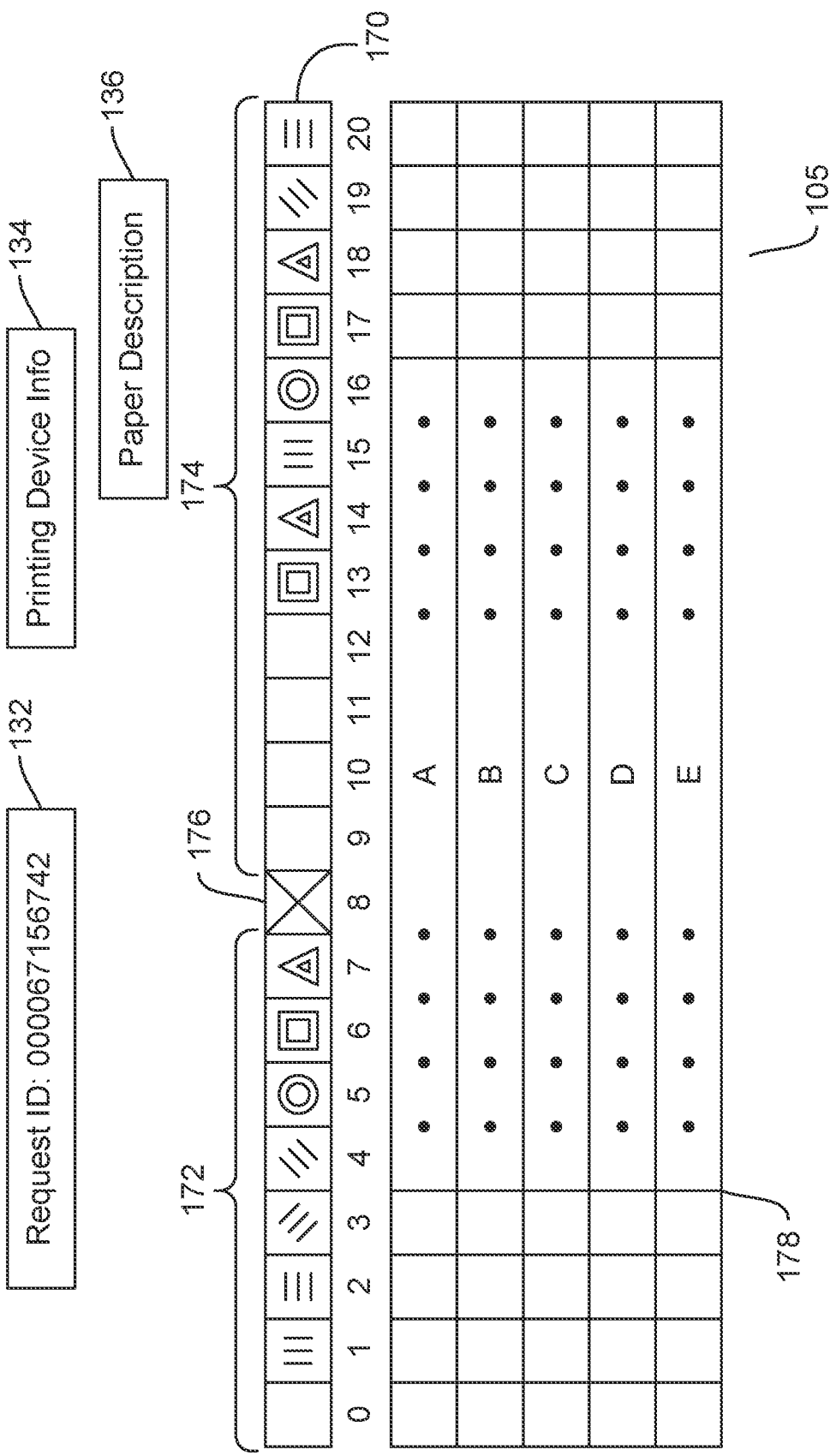
FIG. 1E illustrates a test color sheet having a control strip according to the disclosed embodiments.

An example test color sheet 105 with a control strip 170 is disclosed by FIG. 1E. Test color sheet 105 may be used in conjunction with color measurement tool 108 and application 115 to generate calibration data used to control color reproduction. Control strip 170 is a test color strip with encoded data. The encoded data includes request identifier 132. The disclosed embodiments analyze control strip 170 to determine request identifier 132. This encoded information provides the basis to perform measurements to obtain calibration data for printing device 104.

Test color sheet 105 includes test color strips 178. FIG. 1E shows rows A, B, C, D, and E for the test color strips. Different calibration print jobs may result in different test color strips. The number of test color strips 178 varies between different request types. Thus, request type 126 may be used to generate the appropriate number of test color strips. Request type 126 also may be encoded into control strip 170. Alternatively, when request identifier 132 is determined, then the disclosed embodiments may indicate the request type for the calibration print job.

Control strip 170 contains color patches. In some embodiments, control strip 170 may include 21 color patches. In FIG. 1E, the different colors may be shown by the different graphic symbols with the patches. Certain color patches in control strip 170 include color encoding key 172. The remaining color patches of control strip 170 include request identifier 132 and, in some instances, request type 126.

Color encoding key 172 includes color patches 0-7 that are pre-selected to ensure that the color patches can be differentiated from each other even with variation in the print quality of the test calibration sheets, or test color sheets 105. The encoding key contains all the possible encoding values. The encoding values are based on the position within color encoding key 172. For example, the leftmost color patch represents 0 and the rightmost color patch represents 7. Referring to color encoding key 172, different graphics represent different colors for color patches 0-7 in control strip 170.

Color encoding key 172 is included within control strip 170 on test color sheet 105. This feature allows software application 115 to check that each encoding value can be differentiated without errors. Sufficient differences exist in the color measurements of the color patches to represent the encoding values. For example, if printing device 104 prints test color sheet 105 has exhausted its cyan colorant, then at least two color patches of color encoding key 172 will be too similar to be differentiated and the error may be detected. The remainder of control strip 170 includes a subset of the request information sufficient for identifying the request encoded as color patches using color encoding key 172.

In FIG. 1E, control strip 170 includes encoded request identifier 174 using color patches 9-20 encoded according to color encoding key 172. In some embodiments, encoded request identifier 174 are in the 12 rightmost color patches in control strip 170. Test color patch 8 may be used as encoded request type 176 but may be used for other features. Referring to color encoding key 172, the leftmost 8 color patches in control strip 170 may represent number values used in a request identifier. For example, cyan may be 0, magenta may be 1, yellow may be 2, orange may be 3, and the like. Referring to FIG. 1E, the graphic symbol for 0 may correspond to cyan, the graphic symbol for 1 may correspond to magenta, and so on.

Encoded request identifier 174 shows request identifier 132 as the colors corresponding to the numbers set forth in color encoding key 172. For example, if request identifier 132 is 000067156742, then the corresponding colors are provided in encoded request identifier 174. As noted above, the different graphics may represent the different colors used in control strip 170. It may be seen that these graphics match request identifier 132. For example, color patches 9-12 should be cyan, which is 0 according to color encoding key 172. Color patch 15 is magenta as shown in color patch 1 of color encoding key 172. Thus, the number for this position is 1. Encoded request identifier 174 should match the human-readable value presented on test color sheet 105.

Figure 1F:
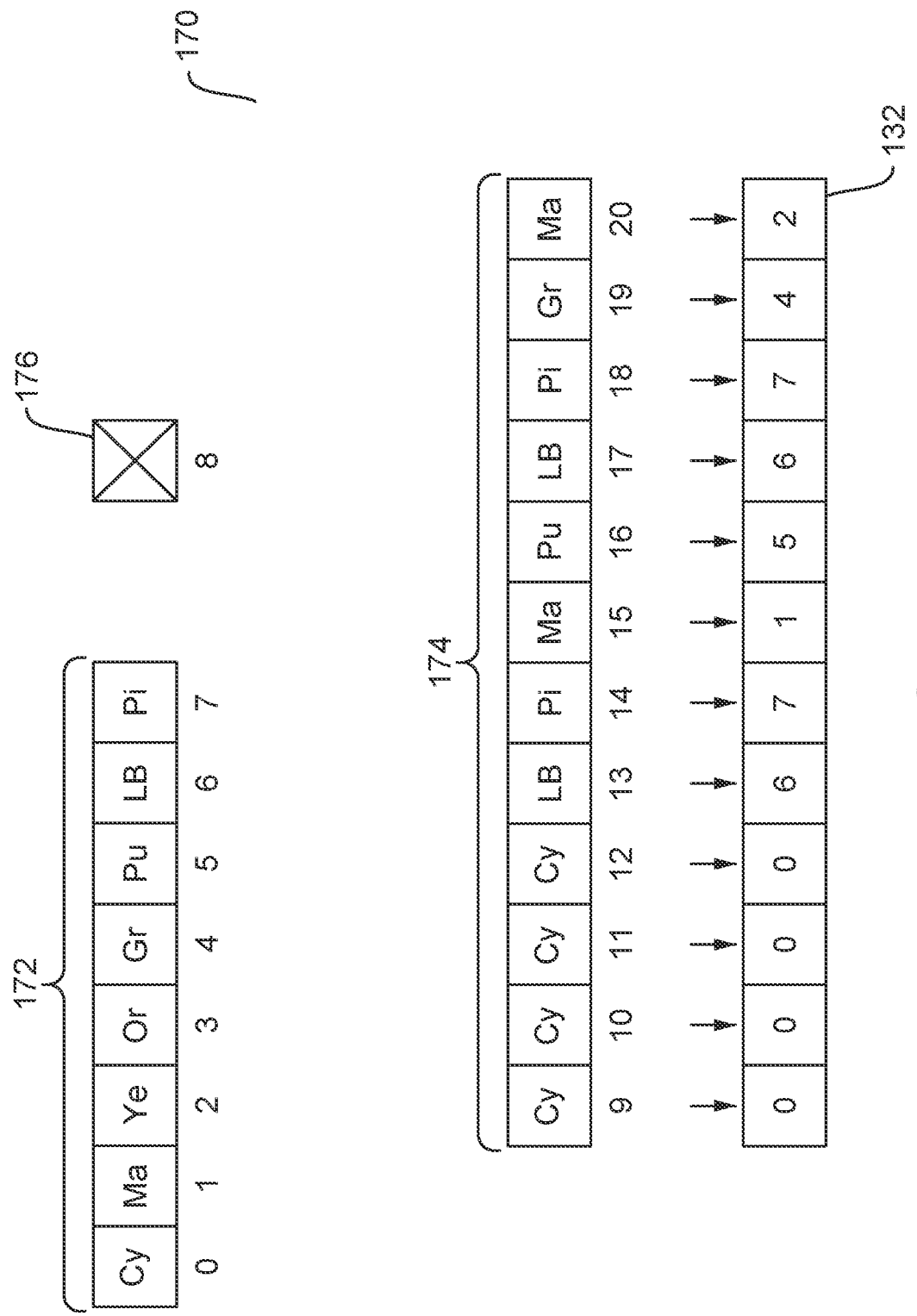
FIG. 1F illustrates a control strip with a color encoding key and an encoded request identifier according to the disclosed embodiments.

These features may be disclosed in greater detail by FIG. 1F. FIG. 1F depicts control strip 170 with color encoding key 172 and encoded request identifier 174 according to the disclosed embodiments. Control strip 170 includes 21 color patches for use within system 100. As in FIG. 1E, the color patches are numbered from 0 (the leftmost color patch) to 20 (the rightmost color patch).

Color encoding key 172 includes color patches 0-7. The colors represented in color encoding key 172 correspond to the numbers used in the request identifiers assigned to calibration print jobs by network service 106. For example, color patches 0-7 may correspond to the numbers 0 to 7. The numbers 8 and 9 may not be represented in this example, but additional color patches may be included in color encoding key 172 to correspond to these numbers. Each color patch 0-7 is a different color to differentiate the corresponding numbers from each other.

For example, color patch 0 for the number 0 may be cyan. Color patch 1 for the number 1 may be magenta. Color patch 2 for the number 2 may be yellow. Color patch 3 for the number 3 may be orange. Color patch 4 for the number 4 may be green. Color patch 5 for the number 5 may be purple. Color patch 6 for the number 6 may be light blue. Color patch 7 for the number 7 may be pink. Other colors may be used as available for these numbers.

Thus, within the rest of control strip 170, a color patch with the color of green will represent the number 4. Referring to encoded request identifier 174, the colors of color patches 9-20 correspond to request identifier 132. When measured by color measurement tool 108, the disclosed embodiments may process the measurements to determine request identifier 132 from test color sheet 105 without the need to manually enter this information or the operator to stop to check that the request identifier is accurate.

As shown in FIG. 1F, encoded request identifier 174 of control strip 170 represents request identifier 132 shown in test color sheet 105. As noted above, request identifier 132 may be 000067156742. Encoded request identifier 174 includes colors within its color patches to indicate these numbers. Color patches 9-12 are cyan, so the corresponding numbers are 0 for these digits. Color patch 13 is light blue, or 6. Color patch 14 is pink, or 7. Color patch 15 is magenta, or 1. Color patch 16 is purple, or 5. Color patch 17 is light blue, or 6. Color patch 18 is pink, or 7. Color patch 19 is green, or 4. Color patch 20 is magenta, or 2. It should be noted that request identifier 132 does not include the number 3 in any of its digits. As a result, none of the color patches in encoded request identifier 174 are green, which corresponds to 3 according to color encoding key 172.

The number of color patches within control strip 170 may be any number, and is not limited to the ones disclosed above. Further, any color may be used to designate a number for the digits within the encoded request identifier. Preferably, color encoding key 172 is scanned prior to encoded request identifier 174 so that application 115 can obtain the colors used to reference the numbers.

Referring back to FIG. 1E, test color sheet 105 also may include human-readable information for printing device information, or name, 134 and paper description 136. This information may be provided by internal database 122 after receiving the request to perform calibration operations. For example, printing device information 134 may include a name within the printing system, such as R&J K-Inkjet 03—Gardena, Calif., a model or type, such as TASKalfa Pro 15000C, or a serial or identification number, such as K3740-Y47521C. All this information may be provided on test color sheet 105. Paper description 136 may include information such as the type of paper, such as EPSON Presentation Paper Matte 27LB.

The operator, due to control strip 170, does not have to manually enter this information into application 115 when collecting measurements of test color strips 178. The disclosed embodiments automatically retrieve the proper calibration references used in the measurements as well as associate the collected measurements to the proper request.

FIG. 1C illustrates a block diagram of color measurement tool 108 and application 115 used to capture the measured values for the test color patches on test color sheet 105 according to the disclosed embodiments. Color measurement tool 108 measures the values for the test color patches 178 in color strips A-E. As disclosed above, the operator may move color measurement tool 108 over the test color patches to measure the colors used in test color sheet 105. This data may be provided to application 115 as measurements 146.

Application 115 collects measurements 146 from color measurement tool 108. Encoding decoder 140 extracts request type 126 and request identifier 132 from the measurements of control strip 170, encoded on test color sheet 105. Application 115 may present request type 126 to the operator using an appropriate software user interface on computing device 114 or printing device 104. The number of color patches displayed by application 115 varies depending on request type 126.

Encoding decoder 140 also determines request identifier 132 from the measurement data from color measurement tool 108. Request identifier 132 is paired with measurements 146 and sent to network service client 142 of application 115. Network service client 142 interfaces with network service 106 to exchange data. In this instance, the data being sent is calibration data to be used in calibration operations from printing device 104. Thus, request identifier 132 and measurements 146 of the test color patches on test color sheet 105 are forwarded to network service 106 from network service client 142.

FIG. 1D depicts a block diagram of network service 106 configured to generate calibration data according to the disclosed embodiments. Network service 106 in this figure is the same as network service 106 shown in FIG. 1. FIG. 1D, however, depicts network service 106 after receiving request identifier 132 and measurements 146 taken from test color sheet 105 as provided by application 115. Calibration request handler 120 saves the measurement data in internal database 122. Request identifier 132 may indicate which calibration request is to be associated with measurement 146.

Calibration request handler 120 retrieves the request data associated with request identifier 132. The request data includes request type 126, printing device identification 128, paper identification 130, and measurements 146 along with request identifier 132. Calibration data 148 is generated by calibration request handler 120 using the retrieved data. Calibration data 148 may be forwarded to printing device 104 for reconfiguration. Thus, operators at print shops are able to perform printing device calibration without manually providing calibration task information, such as the printing device used to print the calibration test sheet, paper used, request type, request identifier, and the like. These features save time and reduce possible error. It also automates many of the tasks associated with printing device calibration.

Figure 2:
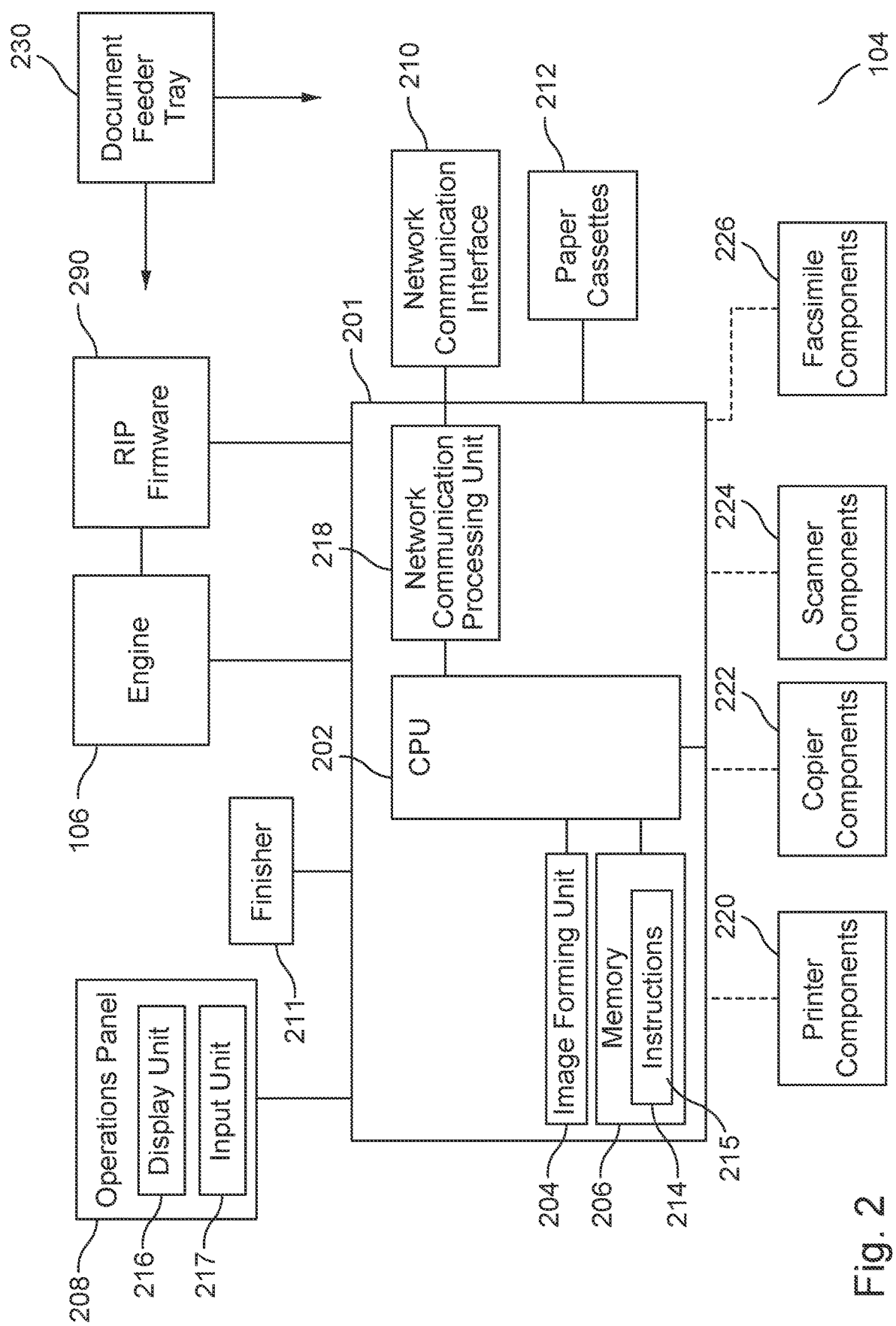
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from network service 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with network service 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from network service 106.

Figure 3:
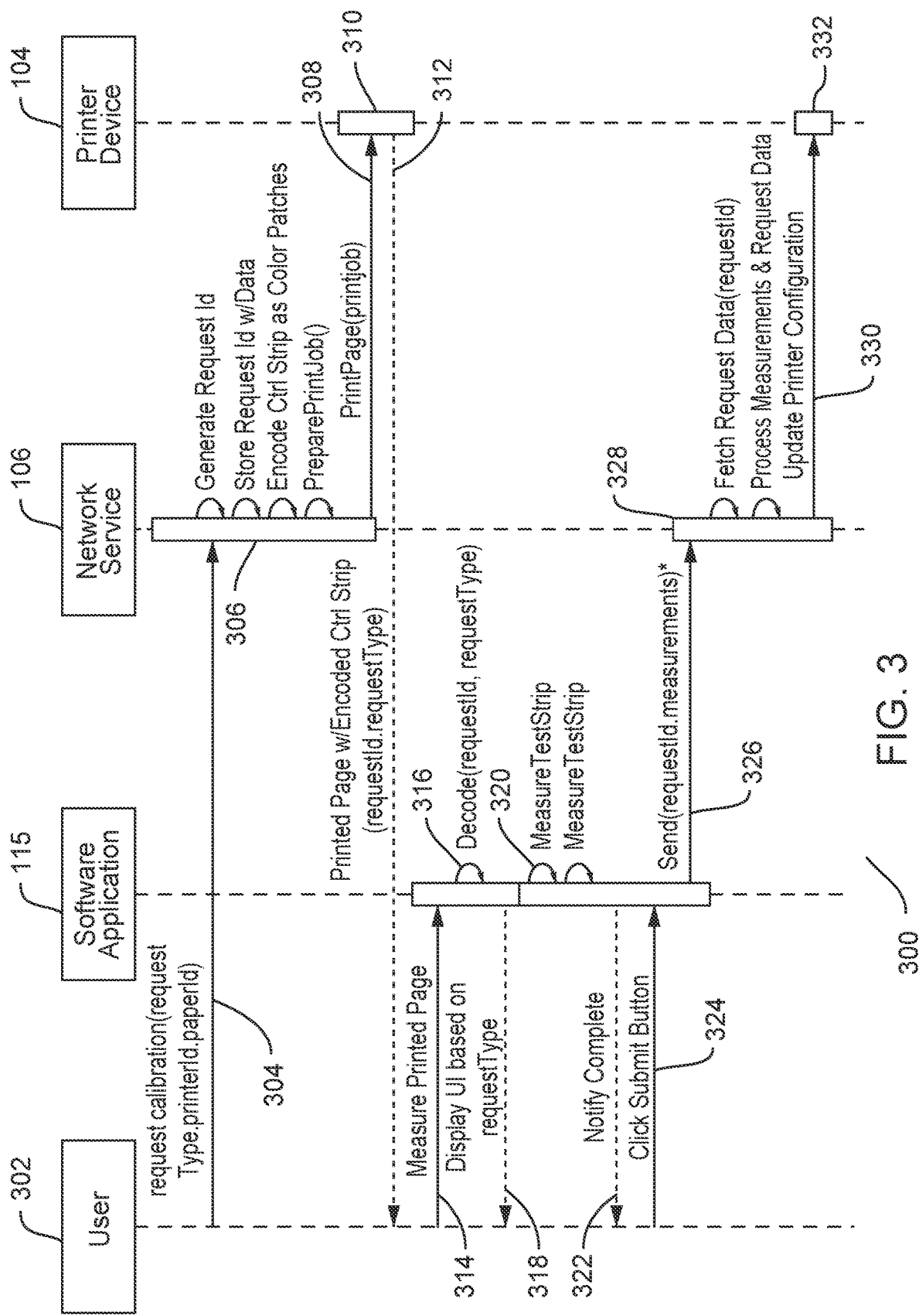
FIG. 3 illustrates a flow diagram for measuring a test color sheet using an encoded control strip to update a printing device according to the disclosed embodiments.

FIG. 3 depicts a flow diagram 300 for measuring test color sheet 105 using encoded control strip 170 to update printing device 104 according to the disclosed embodiments. Flow diagram 300 may refer to FIGS. 1A-2 for illustrative purposes. The embodiments disclosed by flow diagram 300, however, are not limited to the features disclosed in FIGS. 1A-2. FIG. 3 includes user 302, but this feature may also refer to an operator at printing device 104. Further, "user" may refer to computing device 102 or 114 that sends and receives data from network service 106 or printing device 104. The user or operator may input instructions and information in the computing device to enable the operations and actions disclosed below.

Operation 304 executes by user 302 sending a calibration request, or data 103, to network service 106. The calibration request includes request type 126, printing device identification 128, and paper identification 130. Action 306 executes by generating request identifier 132 at network service 106. Action 306 also includes storing request identifier 132 with the calibration request data, or data 103 disclosed above, on network service 106. Action 306 also includes encoding control strip 170 as color patches. Request identifier 132 is encoded within control strip 170 according to color encoding key 172. Network service 106 then prepares the calibration request print job for test color sheet 105.

Operation 308 executes by sending the print job for test color sheet 105 to printing device 104. Action 310 executes by printing test color sheet 105 at printing device 104. Operation 312 executes by providing the printed page of test color sheet 105 with encoded control strip 170. As disclosed above, control strip 170 includes color patches that correspond to request type 126 and request identifier 132.

Operation 314 executes by measuring the color patches of control strip 170 by color measurement tool 108. As disclosed above, color measurement tool 108 may be held and used by hand by an operator or user 302. Color measurement tool 108 may capture color data for the color patches of control strip 170. Action 316 executes by decoding request identifier 132 and request type 126 from the captured measurement data. Operation 318 executes by displaying a user interface based on request type 126 determined from encoded request type 176 on test color sheet 105. Action 316 is executed by application 115.

Application 115 also executes action 320 by measuring test color strips on test color sheet 105. The test color strips include color patches generated according the calibration request, or request type 126. Color measurement tool 108 captures the measurements and data from the color patches on test color sheet 105. Operation 322 executes by notifying user 302 or the operator, or any other component in system 100, that the measurement process is complete. Operation 324 executes by user 302, or the operator, clicking a submit button on computing device 114 to indicate to application 115 that measurement operations are complete.

Operation 326 executes by sending measurements 146 along with request identifier 132 from application 115 to network service 106. Action 328 executes by receiving measurements 146 and request identifier 132. Action 328 also includes fetching or retrieving the request data, such as data 103, based on request identifier 132. Again, the request data may include request type 126, printing device identification 128, and paper identification 130 stored on network service 106. Action 328 also includes processing measurements 146 to generate calibration data 148 using the request data and request identifier 132.

Operation 330 executes by updating configurations for printing device 104 according to calibration data 148. Calibration data 148 may be sent to printing device 104. Further, the updates may be sent to printing device 104. Action 332 executes by configuring printing device according to the updates or calibration data 148.

Figure 4:
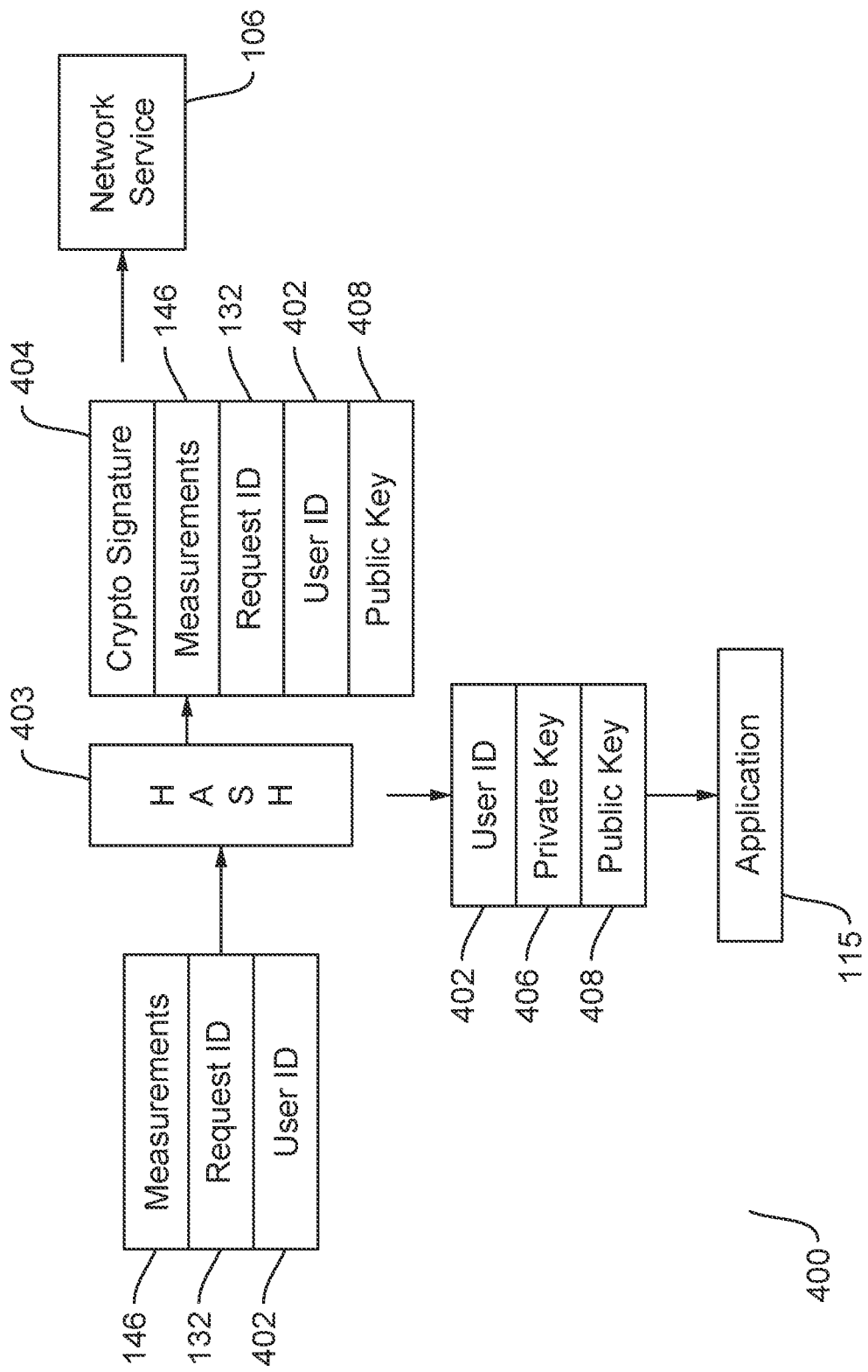
FIG. 4 illustrates a block diagram of the use of a cryptographic signature in conjunction with measurements and the request identifier uploaded to the network service from the application according to the disclosed embodiments.

FIG. 4 depicts a block diagram of the use of a cryptographic signature in conjunction with measurements 146 and request identifier 132 uploaded to network service 106 from application 115 according to the disclosed embodiments. As disclosed above, color measurement tool 108 measures the color patches on test color sheet 105 to generate measurements 146. When all test color strips are measured on test color sheet 105, application 115 generates a cryptographic signature 404 over the data uploaded to network service 106.

Application 115 may use a cryptographic hash algorithm 403 to generate cryptographic signature 404 from color measurements 146, request identifier 132, and a user identifier 402. Cryptographic hash algorithm 403 may be an asymmetric cryptographic signature algorithm. For example, the size of each piece of data received by algorithm 403 may vary and are not necessarily the same. User identifier 402 may identify a user or operator, or a group of users or operators that are allowed to have access to the measurement data.

Cryptographic hash algorithm 403 also generates private key 406 and public key 408 associated with cryptographic signature 404. User identifier 402, private key 406, and public key 408 may be stored in a configuration file with software application 115. User identifier 402 and public key 408 also may be sent to network service 106. Network service 106 stores user identifier 402 and public key 408.

Thus, when the user or operator wants to process the measurement data for the calibration request, private key 406 is presented to application 115, which then associates user identifier 402 and public key 408. Application 115 sends user identifier 402 and public key 408 to network service 106. Network service 106 uses the received user identifier to retrieve public key 408 associated therewith from internal database 122. Cryptographic signature 404 is verified using public key 408 before the uploaded measurement data is processed further by network service 106.

Network service 106 reassembles the calibration request and associates the uploaded measurement data using request identifier 132. The measurement data is processed in different ways depending on request type 126.

Figure 5:
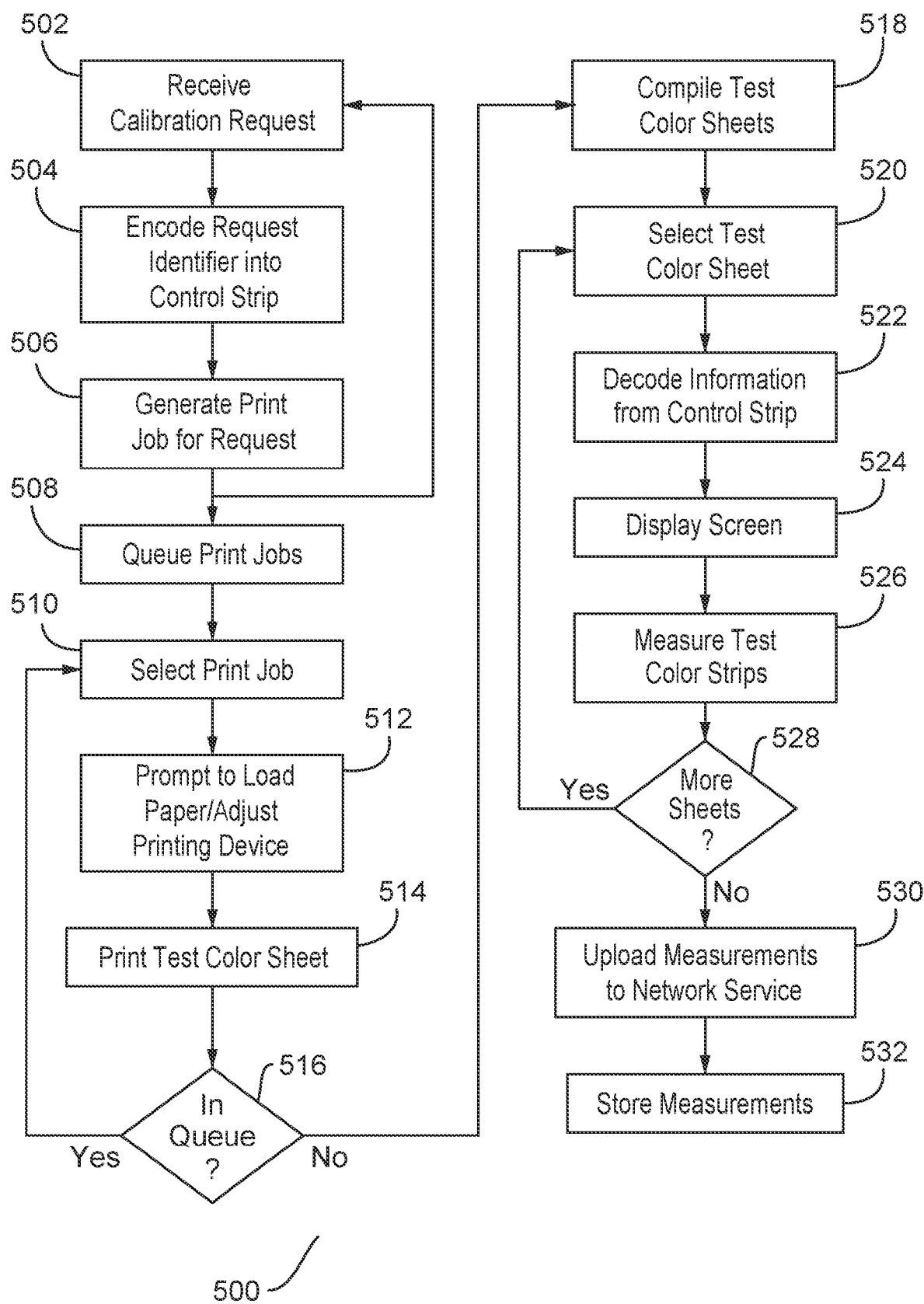
FIG. 5 illustrates a flowchart for handling a plurality of calibration requests using a network service according to the disclosed embodiments.

FIG. 5 depicts a flowchart 500 for handling a plurality of calibration requests using network service 106 according to the disclosed embodiments. Flowchart 500 may refer to features disclosed by FIGS. 1A-4 for illustrative purposes. Flowchart 500, however, is not limited by the features disclosed in FIGS. 1A-4.

In some embodiments, printing device 104 may be a production printing device that is capable of printing many different variations and dozens, if not hundreds, of different types of papers in large quantities. Thus, calibration of such a printing device may not be feasible using a single test color sheet. Multiple print jobs for different test color sheets are sent to printing device 104. Each print job is associated with its own request identifier 132. For example, a user or application 112 or 115 may send bulk test color sheets to printing device 104. Multiple test color sheets may refer to a situation of one test color sheet is sent for a particular paper model or type, another test color sheet is sent for another paper model, and another test color sheet is sent for a particular halftone mode. The print jobs responsible for printing the test color sheets are queued, either at printing device 104 or network service 106. As the test color sheets are printed by printing device 104, it may prompt the operator to load different models of paper. After all test color sheets are printed, the operator may measure the color patches in the control strips and test color strips on all the test color sheets without the need to stop and enter information.

Step 502 executes by receiving a calibration request for a paper type on printing device 104 at network service 106. As shown in FIG. 1A, data 103 may include the information needed for the calibration request, such as request type 126, printing device identification 128, and paper identification 130. Network service 106 may retrieve the appropriate information needed for the print job for the calibration request. It also may generate a request identifier 132 to uniquely identify the calibration request.

Step 504 executes by encoding request identifier 132 and other information into control strip 170 on test color sheet 105 for the calibration request. The disclosed embodiments use color encoding key 172 to encode request identifier 132 into encoded request identifier 174 within control strip 170, as disclosed above. Request type 126 also may be encoded into control strip 170. Control strip 170 also includes color encoding key 172.

Step 506 executes by generating the print job for test color sheet 105 by network service 106. The print job includes data and information to generate and print test color sheet 105 at printing device 104, including one or more rows of test color strips determined according to the request type for the calibration request. Steps 502-506 may be repeated for additional calibration requests. For example, the user may submit several calibration requests to occur on printing device 104 using different types of paper or different calibration measurements. Steps 502-506 are repeated until all requests are processed by network service 106. The different requests may be stored at internal database 122 within network service 106 along with the assigned request identifiers.

Step 508 executes by queuing the print jobs for test color sheets 105 for receipt by printing device 104. The print jobs may be queued at printing device 104 or network service 106. Network service 106 may prioritize the print jobs within the queue such that certain calibration requests fulfilled as soon as possible or before other requests. For example, calibration requests involving color measurements may be performed before those not using color.

Step 510 executes by selecting a print job for a test color sheet 105 to process. Preferably, the print job is the first one in the queue. Step 512 executes by prompting the operator at printing device 104 to load a paper type specified in the calibration request. Alternatively, step 512 may execute by adjusting a component or setting on printing device 104. The plurality of print jobs may involve different sized paper, different weight, paper color, and the like. For example, a first print job may call for a test color sheet 105 having legal sized paper. A second print job may call for a test color sheet 105 having letter sized paper. The operator may be prompted to switch paper trays, if applicable. In other embodiments, the operator may be prompted to check toner or other materials to complete printing of the test color sheet.

Step 514 executes by printing test color sheet 105 for the selected print job at printing device 104. Control strip 170 and test color rows 178 corresponding to request identifier 132 are printed on the test color sheet. Step 516 executes by determining whether additional print jobs are left in the queue. As disclosed above, more than one calibration request may be received before operations are commenced. If step 516 is yes, then flowchart 500 returns to step 510 to select a new print job to process according to the disclosed embodiments.

If step 516 is no, then step 518 executes by determining no further print jobs for calibration requests need be processed. Step 518 also includes compiling the printed test color sheets by the operator. After test color sheets 105 for the plurality of calibration requests are printed, the operator may take them to measure. Step 520 executes by selecting a test color sheet 105. The test color sheet may be selected in the order it was printed. Alternatively, it may be selected according to some criteria.

Step 522 executes by decoding information from control strip 170 on test color sheet 105. The operator may use a color measurement tool 108 to measure color patches within control strip 170 to determine the encoded request identifier and request type. The disclosed embodiments use color encoding key 172 also within control strip 170 to determine the values for the color patches within encoded request identifier 174. Step 524 executes by displaying a screen to the operator according to the decoded request type.

Step 526 executes by measuring test color strips printed on test color sheet 105. Referring to FIG. 1E, test color strips A-E include color patches 178 that are different colors used to show the different color printing capabilities of printing device 104 on the specified paper type. Color measurement tool 108 is moved over the test color strips to capture measurements of the colors. The number of test color strips used in this process is determined by request type 126. Thus, the operator may review the information displayed according to the request type to determine whether the appropriate number of test color strips are shown on test color sheet 105.

Step 528 executes by determining whether additional test color sheets 105 are to be processed using color measurement tool 108 and measurements taken for the corresponding calibration request. If yes, then flowchart 500 returns to step 520 to select another test color sheet. The decoding and measuring steps may be repeated for each test color sheet printed by printing device. Each test color sheet 105 should have a unique request identifier 132 encoded thereon so that the measurements are correlated to the correct calibration request. The operator does not need to enter this information by hand or prior to each measurement process. The disclosed embodiments automatically determine the appropriate request identifier from control strip 170.

If step 528 is no, then step 530 executes by uploading the measurements along with the corresponding request identifier to network service 106. Network service 106 may use the request identifier decoded from test color sheet 105 to correlate measurements 146 to the appropriate calibration request and its stored information. As shown in FIG. 1D, this information may include request type 126, printing device identification 128, and paper identification 130, as provided by the user. Step 532 executes by storing measurements 146 along with the corresponding data at network service 106. Measurements 146 may be retrieved for processing according to the request type to generate calibration data for each calibration request.

Thus, the disclosed embodiments may process bulk calibration requests that use many different sheets of paper as test color sheets and track the processing of the measurements obtained from the test color sheets throughout the system without the need for user or operator involvement. These features provide calibration data for the printing device in a more efficient, faster, and more accurate manner.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for processing data to calibrate a printing device, the method comprising:
    generating a request identifier associated with the printing device and a paper type of a plurality of paper types;
    encoding the request identifier into a control strip for a test color sheet using a color encoding key, wherein the encoded request identifier comprises a plurality of color patches;
    sending the test color sheet including the control strip and having a plurality of test color strips as a print job to the printing device;
    printing the test color sheet at the printing device;
    decoding the request identifier from the control strip using a color measurement tool;
    measuring the plurality of test color strips on the test color sheet with the color measurement tool to generate measurement data;
    generating a cryptographic signature of the measurement data and the request identifier;
    uploading the cryptographic signature, the measurement data, and the request identifier to a cloud-based network service; and
    processing the measurement data to generate calibration data.

2. The method of claim 1, wherein encoding the request identifier includes encoding a request type with the request identifier in the control strip.

3. The method of claim 2, further comprising decoding the request type from the control strip using the color measurement tool.

4. The method of claim 3, further comprising displaying a user interface based on the decoded request type.

5. The method of claim 3, wherein generating the cryptographic signature includes the request type with the measurement data and the request identifier along with a user identifier.

6. The method of claim 2, wherein processing the measurement data based on the request type.

7. The method of claim 1, wherein the control strip includes the color encoding key.

8. The method of claim 7, wherein encoding the request identifier includes encoding the request identifier according to reference color patches in the color encoding key.

9. The method of claim 1, further comprising generating a public key and a private key for the cryptographic signature.

10. A method for capturing measurement data for a plurality of test color sheets corresponding to calibration requests, the method comprising:
encoding a first request identifier and a first request type into a first control strip of color patches in a first test color sheet according to a color encoding key, wherein the first control strip includes the color encoding key;
encoding a second request identifier and a second request type into a second control strip of color patches in a second test color sheet according to the color encoding key, wherein the second control strip includes the color encoding key;
queuing the first test color sheet and the second test color sheet to print at a printing device;
printing the first test color sheet and the second test color sheet at the printing device;
decoding the first request identifier and the first request type from the first control strip for the first test color sheet using a color measurement tool;
measuring at least one first test color strip printed on the first test color sheet using the color measurement tool to generate a first set of measurement data, wherein a number of the at least one first test color strip relates to the first request type;
decoding the second request identifier and the second request type from the second control strip for the second test color sheet using the color measurement tool;
measuring at least one second test color strip printed on the second test color sheet using the color measurement tool to generate a second set of measurement data, wherein a number of the at least one second test color strip relates to the second request type;
uploading the first set of measurement data and the second set of measurement data to a cloud-based network service; and
storing the first set of measurement data according to the first request identifier and the second set of measurement data according to the second request identifier within the network service.

11. The method of claim 10, further comprising prompting a user to load a first type of paper at the printing device based on the first request type and to load a second type of paper at the printing device based on the second request type.

12. The method of claim 10, wherein the color measurement tool is internal to the printing device.

13. The method of claim 10, wherein the number of the at least one first test color strip on the first calibration test sheet differs from the number of the at least one second test color strip on the second calibration test sheet.

14. The method of claim 10, further comprising processing the first set of measurement data according to the first request type and processing the second set of measurement data according to the second request type.

15. The method of claim 10, further comprising displaying a first screen according to the first request type and a second screen according to the second request type.

16. A printing system comprising:
a cloud-based network service; and
a printing device connected to the cloud-based network service,
wherein the printing system, using the cloud-based network service and the printing device, is configured to
generate a request identifier associated with the printing device and a paper type of a plurality of paper types,
encode the request identifier into a control strip on a test color sheet, wherein the encoded request identifier comprises a plurality of color patches,
send a print job to the printing device for the test color sheet having the control strip,
print the test color sheet at the printing device,
decode the request identifier from the control strip of color patches printed on the test color sheet using a color measurement tool,
measure a plurality of test color strips on the test color sheet with the color measurement tool to generate calibration measurement data,
generate a cryptographic signature for the measurement data and the request identifier,
upload the cryptographic signature, the measurement data, and the request identifier to the cloud-based network service,
process the measurement data to generate calibration data, and
update a configuration of the printing device according to the calibration data.

17. The printing system of claim 16, wherein the printing system is configured to encode a request type with the request identifier into the control strip.

18. The printing system of claim 17, wherein the cloud-based network service is configured to process the measurement data according to the request type.

19. The printing system of claim 16, wherein the color measurement tool is within the printing device.

20. The printing system of claim 17, further comprising a computing device connected to the cloud-based network service, wherein an interface is launched at the computing device according to the request type.

* * * * *